(12) United States Patent
Wen et al.

(10) Patent No.: US 8,121,083 B2
(45) Date of Patent: Feb. 21, 2012

(54) METHOD AND DEVICE FOR REPORTING REQUEST FOR UPLINK SCHEDULING OR EMERGENCY IN WIRELESS NETWORK

(75) Inventors: Pingping Wen, Shanghai (CN); Mingli You, Shanghai (CN); Tao Yang, Shanghai (CN); Jin Liu, Shanghai (CN)

(73) Assignee: Alcatel Lucent, Paris (FR)

( * ) Notice: Subject to any disclaimer, the term of this patent is extended or adjusted under 35 U.S.C. 154(b) by 307 days.

(21) Appl. No.: 12/438,082

(22) PCT Filed: Aug. 21, 2007

(86) PCT No.: PCT/CN2007/002529
§ 371 (c)(1),
(2), (4) Date: Feb. 19, 2009

(87) PCT Pub. No.: WO2008/031326
PCT Pub. Date: Mar. 20, 2008

(65) Prior Publication Data
US 2011/0026467 A1    Feb. 3, 2011

(30) Foreign Application Priority Data

Aug. 22, 2006 (CN) .......................... 2006 1 0030296

(51) Int. Cl.
*H04Q 7/00*    (2006.01)
*H04J 3/16*    (2006.01)
(52) U.S. Cl. .................................. 370/329; 370/468
(58) Field of Classification Search .................. None
See application file for complete search history.

(56) References Cited

U.S. PATENT DOCUMENTS

| | | | |
|---|---|---|---|
| 6,747,962 B2 * | 6/2004 | Lintulampi et al. | 370/329 |
| 7,145,895 B2 * | 12/2006 | Mueckenheim et al. | 370/348 |
| 7,539,160 B2 * | 5/2009 | Virtanen et al. | 370/329 |
| 7,630,338 B2 * | 12/2009 | Vesterinen et al. | 370/329 |
| 2004/0146036 A1 * | 7/2004 | Parantainen et al. | 370/341 |
| 2004/0252661 A1 * | 12/2004 | Lintulampi et al. | 370/329 |
| 2005/0054359 A1 | 3/2005 | Ishii et al. | |

OTHER PUBLICATIONS

International Search Report.

* cited by examiner

*Primary Examiner* — Hong Cho
(74) *Attorney, Agent, or Firm* — Fay Sharpe LLP

(57) ABSTRACT

The object of the present invention is to provide a reporting strategy for uplink scheduling request information in wireless telecommunication network. Above all, a method for the user equipment to report the uplink scheduling request information to the base station in wireless telecommunication network is disclosed. Firstly, the user equipment computes the overall service data amount of all radio bearers in each group of radio bearers in the buffer of the user equipment; then the user equipment only reports group-related information of triggered one or more groups of radio bearers to the base station. The present invention further proposes a method in the user equipment in wireless telecommunication network for reporting the emergency information to the base station, that is, the user equipment judges whether each radio bearer is in the emergency, and when one or more radio bearers are in the emergency, the user equipment sends emergency indication information to the base station. By the combination of the two reporting method, the base station can realize efficient and fair scheduling.

20 Claims, 8 Drawing Sheets

| the number of the triggered groups of radio bearers | group indicator 1 | the overall data amount of group indicator 1 | ...... | group indicator N | the overall data amount of group indicator N |
|---|---|---|---|---|---|

FIG. 2a

| the number of the triggered groups of radio bearers | group indicator 1 | ...... | group indicator N | the overall data amount of group indicator 1 | ...... | the overall data amount of group indicator N |
|---|---|---|---|---|---|---|

FIG. 2b

METHOD AND DEVICE FOR REPORTING REQUEST FOR UPLINK SCHEDULING OR EMERGENCY IN WIRELESS NETWORK

FIELD OF THE INVENTION

The present invention relates to wireless telecommunication network, and particularly to scheme of reporting request information for uplink scheduling or emergency of the user equipment.

BACKGROUND OF THE INVENTION

In the E-UTRAN (Evolved Universal Terrestrial Radio Access Network), the data is transmitted via the uplink shared channel. The BS (Base Station) allocates resources for each UE (User Equipment). In order to allocate resources and to provide service to each UE according to its own need so as to realize better multiplexing performance in uplink transmission, the BS needs to know how many resources it should allocate to each UE; therefore the UEs need report their own requirements to the BS in an efficient way. The reporting scheme of scheduling information, which supports uplink group scheduling, is an important feature defined in the progress of LTE (Long Term Evolution) standardization.

The following issues need to be considered during the design of the report of scheduling information:
1. The Scheduling Information should Provide Sufficient Information to Increase the Efficiency of Scheduling In the prior wireless data telecommunication system, resource allocation usually applies the following two methods: buffer-aware algorithm and buffer-blind algorithm. Compared with the buffer-blind algorithm, the buffer-aware algorithm can increase the efficiency of scheduling since it carries out the scheduling on the basis of the buffer size information reported by the UE, while the buffer-blind algorithm schedules only according to the usage status of the resources allocated in the past. Therefore, buffer report, i.e., buffer size report is the important scheduling information required to be reported. And due to the fact that all the services of QoS in LTE are transmitted via shared channel, it requires the BS to provide efficient scheduling and to satisfy the requirement of latency and packet error, thus the latency information is also required to be reported to the BS by the UEs. This requires a well defined efficient reporting scheme for latency information.
2. The Scheduling Information should Support Qos-Aware Scheduling To support QoS-aware scheduling, the report of scheduling information should be differentiated according to different QoS.
3. The Overhead of Scheduling Information should be as Few as Possible The overhead of scheduling information should be as few as possible because the amount of the overhead influences the uplink capacity directly.

So far, there have been several reporting schemes of scheduling information. Reference 1 (R2-068029, Buffer Reporting for E-UTRAN, ETRI, Athens, Greece, 27-31 Mar. 2006) only discussed the method of buffer report. Although it supports the buffer report method based on priority, the format of report includes the buffer information of all service streams and the size of the format of report is fixed. Reference 2 (R2-061023, Timer-based Resource Request, ETRI, Athens, Greece, 27-31 Mar. 2006) discussed different content and mechanism of report for different services, but the descriptions were rough and didn't propose detailed format of report.

Reference 1 only discussed buffer report without report of latency information. Reference 2 proposed the concept of head of line (HOL) delay, but it is the reporting method for absolute latency information.

In HSUPA (High Speed Uplink Packet Access) system, the report information is transmitted via scheduling information and happy bit. The scheduling information is transmitted via MAC signaling, and it comprises the overall buffer size and buffer length of the logic channel with the highest priority. This kind of reporting method could not differentiate the priority of service with low priority; therefore, the scheduling based on priority could not be supported. Furthermore, the signaling overhead is relatively high due to the frequent reports. The happy bit is used only for indicating the satisfactory for the present allocated resource, but could not indicate the latency information and packet loss information.

SUMMARY OF THE INVENTION

To solve the technical problem in the art, one object of the present invention is to provide one technical solution for reporting request information for uplink scheduling or emergency (including latency information and packet loss) in wireless telecommunication network.

According to the first aspect of the present invention, there is provided a method in a user equipment in wireless telecommunication network for reporting request information for uplink scheduling to a base station. Firstly, the user equipment computes the overall service data amount of all radio bearers in each group of radio bearers in the buffer of the user equipment, wherein, each group of radio bearers comprises one or more radio bearers with the same priority; and then the user equipment only reports group-related information of triggered one or more groups of radio bearers to the base station.

According to the second aspect of the present invention, there is provided a reporting device in a user equipment in wireless telecommunication network for reporting request information for uplink scheduling to a base station. The reporting device comprises a computing means and a controlled sending means. The computing means is used for computing the overall service data amount of all radio bearer in each group of radio bearers in the buffer of the user equipment, wherein, each group of radio bearers comprises one or more radio bearers with the same priority; and the controlled sending means is used for only reporting group-related information of triggered one or more groups of radio bearers to the base station.

According to the third aspect of the present invention, there is provided a method in a base station in wireless telecommunication network for allocating wireless resource for a user equipment. Firstly, the base station receives group-related information of one or more groups of radio bearers from the user equipment; and then the base station determines wireless resource allocated for each group of radio bearers in the user equipment according to the received group-related information.

According to the forth aspect of the present invention, there is provided a wireless resource allocating device in a base station in wireless telecommunication network for allocating wireless resource for a user equipment. The device comprises a receiving means and a determining means. Wherein, the receiving means is used for receiving group-related information of one or more groups of radio bearers from the user equipment; and the determining means is used for determining wireless resource allocated for each group of radio bearers in the user equipment according to the received group-related information.

According to the fifth aspect of the present invention, there is provided a method in a user equipment in wireless telecommunication network for reporting the emergency of radio bearers to a base station. Firstly, the user equipment judges whether each radio bearer is in the emergency; and the user equipment sends emergency indication information to the base station when one or more said radio bearers are in the emergency.

According to the sixth aspect of the present invention, there is provided a device in a user equipment in wireless telecommunication network for reporting the emergency information of radio bearers to a base station. The device comprises a judging means and a sending means. Wherein, the judging means is used for judging whether each radio bearer is in the emergency; and the sending means is used for sending emergency indication information to the base station when one or more said radio bearers are in the emergency.

According to the seventh aspect of the present invention, there is provided a wireless resource scheduling method in a base station in wireless telecommunication network for decreasing the uplink transmission latency and data packet loss of a user equipment. Firstly, the base station receives emergency indication information from the user equipment; and then the base station allocates corresponding wireless resource for radio bearers in the emergency in the user equipment according to the received emergency indication information.

According to the eighth aspect of the present invention, there is provided a wireless resource scheduling device in a base station in wireless telecommunication network for decreasing the uplink transmission latency and data packet loss of a user equipment. The wireless resource scheduling device comprises a receiving means and a determining means. Wherein, the receiving means is used for receiving emergency indication information from the user equipment; and the determining means is used for determining to allocate corresponding wireless resource for radio bearers in the emergency in the user equipment according to the received emergency indication information.

The present invention possesses the following advantages over the prior art:
1. through the proposed reporting method for scheduling information, buffer status information and QoS information such as transmission latency and data packet loss information could be reported;
2. the buffer status report based on priority has flexible trigger mechanism based on priority and flexible signaling (through layer 2 (L2) filling or controlling Protocol Data Unit (PDU) transmission), and meanwhile has less signaling overhead;
3. emergency indication information is introduced which is used for reporting emergent transmission latency and data packet loss information (level). This reporting method could save the overhead of the report of detailed QoS information to a large extent. The emergency indication information could be transmitted via Layer 1 (L1) signaling.
4. through the proposed reporting method for scheduling information, efficient scheduling algorithms based on priority could be designed to meet the QoS requirements such as transmission latency and data packet loss rate.

BRIEF DESCRIPTION OF THE DRAWINGS

These and other features, objects and advantages will be apparent by going through the hereinafter set forth detailed description of the unlimited embodiments with reference to the drawings.

FIG. 2a is a detailed format of request information when a UE reports request information for uplink scheduling to a BS in wireless telecommunication network according to one embodiment of the present invention;

FIG. 2b is a detailed format of request information when a UE reports request information for uplink scheduling to a BS in a wireless telecommunication network, according to another embodiment of the present invention;

DETAILED DESCRIPTION OF PREFERRED EMBODIMENTS

Figure 1:
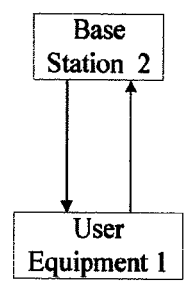
FIG. 1 is a network topology of wireless telecommunication network according to one embodiment of the present invention.

As shown in FIG. 1, in LTE, BS2 usually allocates wireless resource for UE1 according to the scheduling request from UE1. The report of scheduling information is an important issue in LTE. In order to support efficient scheduling, UE1 needs to utilize minimum signaling to provide as much information as possible. LTE supports QoS-based scheduling. If BS2 wants to realize a fair scheduling of different QoS services among different UEs, it requires UE1 to support buffer status report based on QoS. But what about the granularity of the QoS-based buffer report in UE1? Currently there are three choices: 1) the buffer report based on UE1; 2) the buffer report based on the group of radio bearers; and 3) the report based on radio bearer. Wherein, the buffer report based on UE1 indicates to report the data amount of the whole buffer in UE1. It is obvious that this reporting method can not differentiate the priorities of the services among different UEs, however, it has relatively lower signaling overhead. The buffer report based on the group of radio bearers indicates to respectively report the data amount of each group of radio bearers. The group of radio bearers indicates the combination of radio bearers with the same service priority, and the data amount of the group of radio bearers is obtained by adding the data amount of all radio bearers in the group. This reporting method could differentiate QoS and has a medium signaling overhead. And the report based on radio bearer indicates to respectively report the data amount of each radio bearer. It is obvious that this reporting method could provide more detailed report of QoS, but the signaling overhead is tremendous. Thus the buffer report based on the group of radio bearers is recommended.

The BS2 is generally aware of how many packets have been transmitted and how many are waiting to be transmitted due to the resson that most VoIP encoders without silence compression generate packets with predefined length at a fixed sampling interval. But due to the high burst of MPEG image service, and the higher burst of interactive game service and FTP service, it is difficult for the BS2 to be aware of the size of the buffer if the UE1 doesn't provide buffer status report. If the periodical reporting method is supported, these services require different periods, for example, the VoIP service requires few buffer reports (theoretically none) compared with interactive game service and FTP service. If the event-triggered reporting method is supported, the triggering mechanisms are different (possibly independently triggered for each kind of service) due to the reason that these services are with different QoS requirements. Thus, the following circumstance may occur: the buffer report of one service is triggered (no matter periodically triggered or event-triggered), and there is no need to report the buffer status for other services. Therefore the following conclusion can be made: each report doesn't necessarily contain the information of all groups of radio bearers, the buffer report includes the number of the reported groups of radio bearers, the group indicator and the data amount of the corresponding groups of radio bearers, and the recommended format of report is shown in FIG. 2a.

The buffer status report could only report how much data there is in the buffer, which means how much data needs to be transmitted. But only based on this information, the BS2 could not be aware of the transmission latency and data packet loss information. Thus emergency indication information is introduced here to indicate the transmission latency and data packet loss information. The BS2 could realize efficient and fair scheduling through the combination of the buffer status report and the emergency indication information.

Detailed description of the present invention is given below combined with FIG. 2-FIG. 8.

Figure 3:
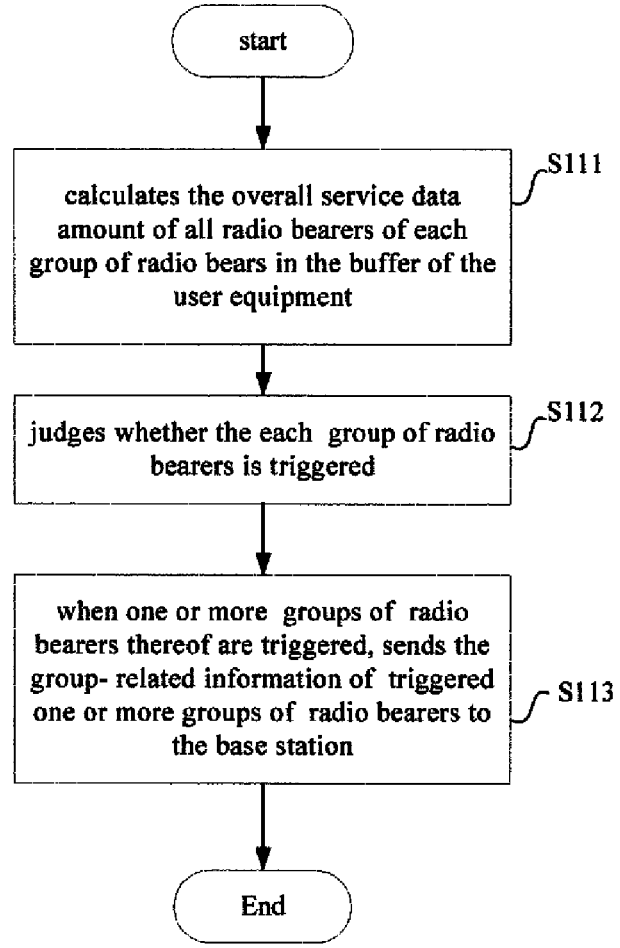
FIG. 3 is a flowchart of a method in a UE in wireless telecommunication network for reporting the request for uplink scheduling according to one embodiment of the present invention.

FIG. 3 shows a flowchart of a method in UE1 in wireless telecommunication network for reporting the request for uplink scheduling to BS2 according to one embodiment of the present invention.

In step S111, the overall service data amount of all radio bearers in each group of the radio bearers in the buffer of UE1 are calculated, wherein, each group of radio bearers comprises one or more radio bears with the same priority.

After step S111, only group-related information of triggered one or more groups of radio bearers is reported. The details are shown in step S112 and S113.

In step S112, whether each group of radio bearers is triggered is judged. Here, the trigger can be either event trigger or time trigger.

A detailed example of event trigger is that when the overall service data amount of a certain group of radio bearers in the buffer of UE1 exceeds the corresponding predefined threshold, the group of radio bearers is judged as triggered. Another example of event trigger is that when the overall service data amount of a certain group of radio bearers in the buffer of UE1 is lower than the corresponding predefined threshold, then the group of radio bearers is judged as triggered. Still another detailed example of event trigger is that the change of the service data amount of a certain group of radio bearers in the buffer of UE1 exceeds the corresponding predefined threshold during a certain time period, the group of radio bearers is judged triggered. There are various kinds of examples of event trigger, which are not limited to the above mentioned examples.

A detailed example of time trigger is that when the predefined report time for a certain group of radio bearers arrives, the group of radio bearers is judged as triggered, here, the predefined report time can be periodic or non-periodic, which is based on the specific service category.

In step S113, when one or more groups of radio bearers therein are triggered, then group-related information of the triggered one or more groups of radio bearers is sent to the BS2. Here, the group-related information comprises the number of the triggered one or more groups of radio bearers, the group indicator and the overall service data amount of each of the triggered groups of radio bearers, and the order thereof is shown in FIG. 2a, or FIG. 2b, but not limited by this. The group-related information can be sent to the BS2 via data frame in the media access control (MAC) layer, or can be sent to the BS2 via a new control protocol data unit.

Figure 4:
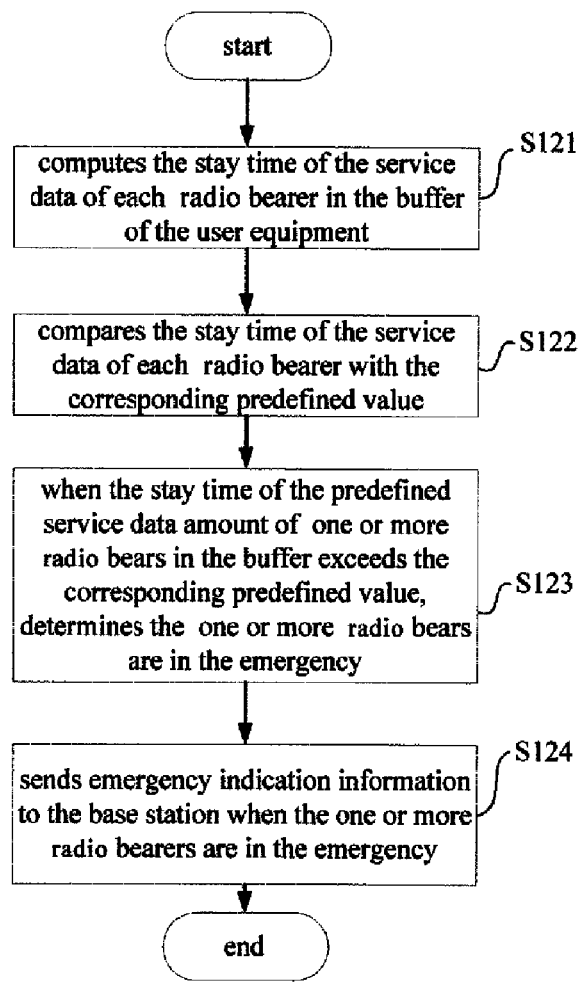
FIG. 4 is a flowchart of a method in a UE in wireless telecommunication network for reporting the emergency of radio bearers according to one embodiment of the present invention.

FIG. 4 shows a flowchart of a method in UE1 in wireless telecommunication network for reporting the emergency of radio bearers to BS2 according to one embodiment of the present invention.

Firstly, whether each radio bearer is in the emergency is determined, which can be divided into step S121, S122 and S123.

In step S121, the stay time of the service data of each radio bearer in the buffer of UE1 is calculated.

In step S122, the stay time of the service data of each radio bearer is compared with the corresponding predefined value.

In step S123, when the stay time of the service data of the one or more radio bearers in the buffer exceeds the corresponding predefined value, then the one or more radio bearers are judged as being in the emergency.

Then, in step S124, when the one or more radio bearers are in the emergency, the emergency indication information is sent to the BS2. The emergency indication information comprises the information for indicating the emergent situation and/or the emergent level. The emergency indication information can be transported via control signaling.

In practical situation, for those latency-sensitive services, the emergency indication information is used to indicate that a certain number of bits (L1) have already waited in the buffer of Radio Link Controller (RLC) for a certain time (T1). For those error-sensitive services, the emergency indication information is used to indicate that a certain number of bits (L2) will be abandoned by the RLC abandon mechanism after a certain time (T2). L1, L2, T1, T2 can be determined according to the QoS of each radio bearer.

When the emergency indication information is implemented, only one bit may be needed for all radio bearers. When one bit is applied, as long as a radio bearer satisfies the emergent condition, the radio bearer is in the emergency, and the emergent bit is set to "emergent". And only when all radio bearers are in the un-emergent condition, the emergent bit is set to "un-emergent". Such reporting method can provide transmission latency and data packet loss information with least signaling overhead. BS2 allocates wireless resource to UE1 in the emergency, and UE1 determines the radio bearer to which the wireless resource is provided.

Also, each group of radio bearers (the group of multiple radio bearers with the same priority) or each radio bear can use one bit to indicate whether each group of radio bearers or each radio bearer is in the emergency. This method has better granularity, and it can provide transmission latency and data packet loss information with better granularity, with which the BS2 can schedule more accurately. However, compared with the above mentioned method that all radio bearers share one bit, this method requires larger signaling overhead.

Furthermore, two or three or more bits can replace the one bit in the above two methods. More than one bits can define multiple emergent situation levels, which can differentiate the emergent degrees so that the BS2 can obtain more detailed transmission latency and data packet loss information, thus handle these Qos information more flexibly. Compared with one bit, the signaling overhead is larger in this method.

Figure 5:
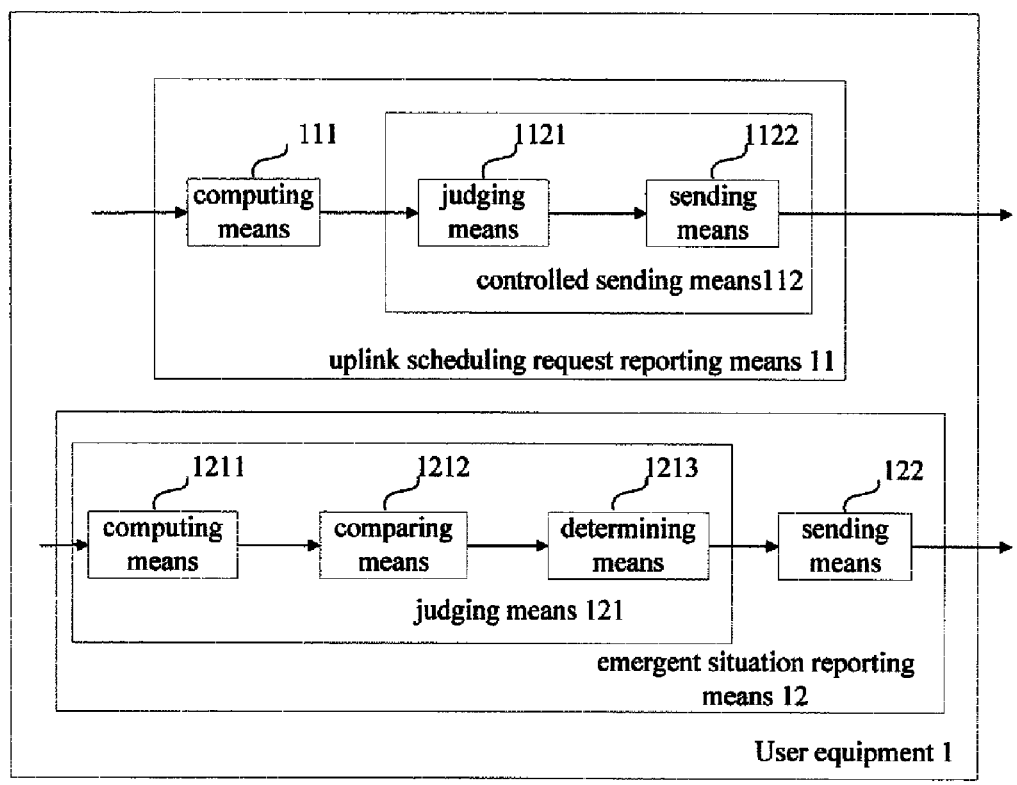
FIG. 5 is a block diagram of a UE in wireless telecommunication network according to one embodiment of the present invention.

FIG. 5 is a block diagram of a UE in wireless telecommunication network according to one embodiment of the present invention. The UE1 comprises an uplink scheduling request report means 11 and an emergent situation report means 12.

The uplink scheduling request report means 11 comprises a computing means 111 and a controlled sending means 112. The controlled sending means 112 comprises a judging means 1121 and a sending means 1122.

The computing means 111 firstly calculates the overall service data amount of all radio bearers in each group of radio bearers in the buffer of UE1, wherein, each group of radio bearers comprises one or more radio bears with the same priority.

Then, the controlled sending means 112 only reports group-related information of triggered one or more groups of radio bearers to the BS2.

Wherein, the judging means 1121 judges whether the each group of radio bearers is triggered. Here, the trigger can be either event trigger or time trigger.

A detailed example of event trigger is that when the overall service data amount of a certain group of radio bearers in the buffer of UE1 exceeds the corresponding predefined threshold, the group of radio bearers is judged as triggered. Another example of event trigger is that when the overall service data amount of a certain group of radio bearers in the buffer of UE1 is lower than the corresponding predefined threshold, then the group of radio bearers is judged as triggered. Still another detailed example of event trigger is that the change of the service data amount of a certain group of radio bearers in the buffer of UE1 exceeds the corresponding predefined threshold during a certain time period, the group of radio bearers is judged as triggered. There are various kinds of examples of event trigger, which are not limited to the above mentioned examples.

A detailed example of time trigger is that when the predefined report time for a certain group of radio bearers arrives, the group of radio bearers is judged as triggered, here, the predefined report time can be periodic or non-periodic, which is based on the specific service category.

When the judging means 1121 judges that one or more groups of radio bearers therein are triggered, then the sending means 1122 sends group-related information of the triggered one or more groups of radio bearers to the BS2. Here, the group-related information comprises the number of the triggered one or more groups of radio bearers, the group indicator and the overall service data amount of each of the triggered groups of radio bearers, and the order thereof is shown in FIG. 2a, or FIG. 2b, but not limited by this. The group-related information can be sent to the BS2 via data frame in the media access control (MAC) layer, or can be sent to the BS2 via a new control protocol data unit.

The emergent situation report means 12 comprises a judging means 121 and a sending means 122. The judging means 121 comprises a computing means 1211, a comparing means 1212 and a determining means 1213.

The judging means 121 determines whether each radio bearer is in the emergency. To be specific, the computing means 1211 calculates the stay time of the service data of the each radio bearer in the buffer of the UE1. The comparing means 1212 compares the stay time of the service data of the each radio bearer with the corresponding predefined value. When the stay time of the predefined service data amount of the one or more radio bearers exceeds the corresponding predefined value, the determining means 1213 determines that the one or more radio bearers are in the emergency.

When the one or more radio bearers are in the emergency, the sending means 122 sends emergency indication information to the BS2. The emergency indication information comprises the information for indicating the emergent situation and/or emergent level. The emergency indication information can be transported via control signaling.

In practical situation, for those latency-sensitive services, the emergency indication information is used to indicate that a certain number of bits (L1) have already waited in the buffer of Radio Link Controller (RLC) for a certain time (T1). For those error-sensitive services, the emergency indication information is used to indicate that a certain number of bits (L2) will be abandoned by the RLC abandon mechanism after a certain time (T2). L1, L2, T1, T2 can be determined according to the QoS of each radio bearer.

When the emergency indication information is implemented, only one bit may be needed for all radio bearers. When one bit is applied, as long as a radio bearer satisfies the emergent condition, the radio bearer is in the emergency, and the emergent bit is set to "emergent". And only when all radio bearers are in the un-emergent condition, the emergent bit is set to "un-emergent". Such reporting method can provide transmission latency and data packet loss information with least signaling overhead. BS2 allocates wireless resource to UE1 in the emergency, and UE1 determines the radio bearer to which the wireless resource is provided.

Also, each group of radio bearers (the group of multiple radio bearers with the same priority) or each radio bear can use one bit to indicate whether each group of radio bearers or each radio bearer is in the emergency. This method has better granularity, and it can provide transmission latency and data packet loss information with better granularity, with which the BS2 can schedule more accurately. However, compared with above mentioned method that all radio bearers share one bit, this method requires larger signaling overhead.

Furthermore, two or three or more bits can replace the one bit in the above two methods. More than one bits can define multiple emergent situation levels, which can differentiate the emergent degrees so that the BS2 can obtain more detailed transmission latency and data packet loss information, thus handle these Qos information more flexibly. Compared with one bit, the signaling overhead is larger in this method.

Figure 6:
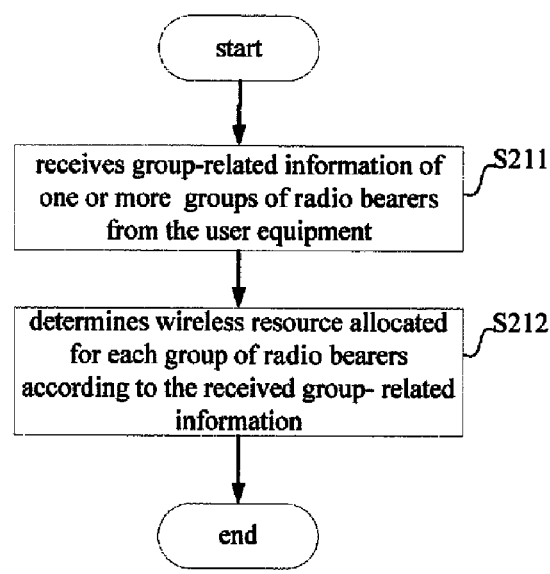
FIG. 6 is a flowchart of a method in a BS in wireless telecommunication network for allocating wireless resource for a UE according to the request for uplink scheduling from the UE according to one embodiment of the present invention.

FIG. 6 shows a flowchart of a method in the BS2 in wireless telecommunication network for allocating wireless resource for UE1 according to the request for uplink scheduling from UE1 according to one embodiment of the present invention.

In step S211, group-related information of one or more groups of radio bearers from UE1 and other information needed for allocating resource for the UE1 are received.

In step S212, wireless resource allocated for each group of radio bearers in the UE1 are determined according to the received group-related information and other information needed for allocating resource for the UE1.

Here, the group-related information comprises the number of the triggered one or more groups of radio bearers, the group indicator and the overall service data amount of each of the triggered groups of radio bearers, and the order thereof is shown in FIG. 2a, or FIG. 2b, but not limited by this. Here the other information needed for allocating resource for UE1 comprises information such as channel condition, etc.

Figure 7:
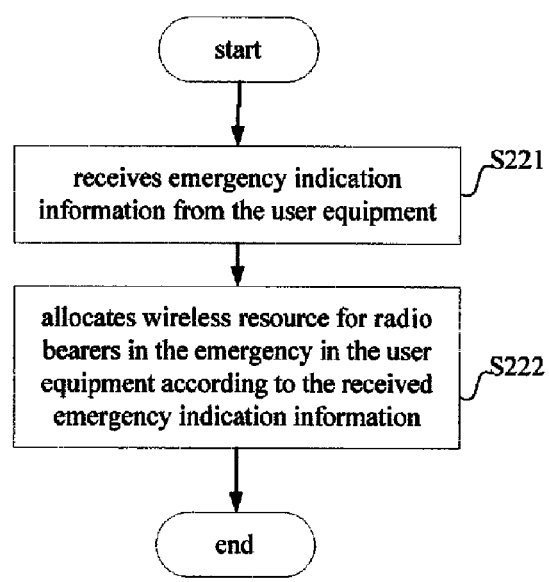
FIG. 7 is a flowchart of a method in a BS in wireless telecommunication network for allocating wireless resource for a UE to decrease the uplink latency and data packet loss for the UE according to one embodiment of the present invention.

FIG. 7 is a flowchart of a method in the BS2 in wireless telecommunication network, for allocating wireless resource for UE1 to decrease the uplink latency and data packet loss for the UE1 according to one embodiment of the present invention.

In step S221, emergency indication information and other information needed for allocating resource for UE1 are received from UE1, and in step S222, wireless resource are allocated for radio bearers in the emergency in UE1 according to the emergency indication information and other information needed for allocating resources for LTE1. Wherein, the emergency indication information comprises the information for indicating emergent situation and/or emergent level, and the other information needed for allocating resource for UE1 comprises information such as channel condition, etc.

In practical situation, for those latency-sensitive services, the emergency indication information is used to indicate that a certain number of bits (L1) have already waited in the RLC buffer for a certain time (T1). For those error-sensitive services, the emergency indication information is used to indicate that a certain number of bits (L2) will be abandoned by the RLC abandon mechanism after a certain time (T2). L1, L2, T1, T2 can be determined according to the QoS of each radio bearer.

When the emergency indication information is implemented, only one bit may be needed for all radio bearers. When one bit is applied, as long as a radio bearer satisfies the emergent condition, the radio bearer is in the emergency, and the emergent bit is set to "emergent". And only when all radio bearers are in the un-emergent condition, the emergent bit is set to "un-emergent". Such reporting method can provide transmission latency and data packet loss information with least signaling overhead. BS2 allocated wireless resource to UE1 in the emergency, and UE1 determines the radio bearer to which the wireless resource is provided.

Also, each group of radio bearers (the group of multiple radio bearers with the same priority) or each radio bear can use one bit to indicate whether each group of radio bearers or each radio bearer is in the emergency. This method has better granularity, it can provide transmission latency and data packet loss information with better granularity, with which the BS2 can schedule more accurately, but compared with the above mentioned method that all radio bearers share one bit, this method requires larger signaling overhead.

Furthermore, two or three or more bits can replace the one bit in the above two methods. More than one bits can define multiple emergent situation level, which can differentiate the emergent degrees so that the BS2 can obtain more detailed transmission latency and data packet loss information, thus handle these Qos information more flexibly. Compared with one bit, the signaling overhead is larger in this method.

Figure 8:
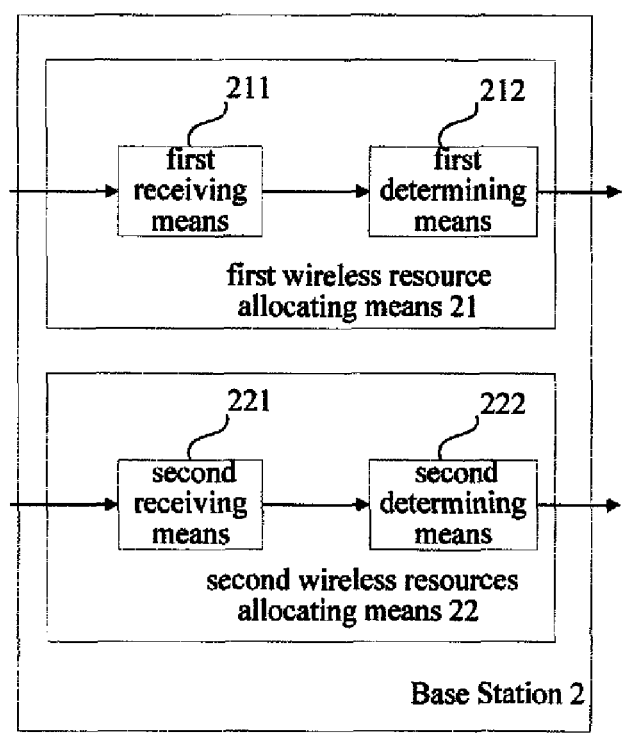
FIG. 8 is a block diagram of a BS in wireless telecommunication network according to one embodiment of the present invention.

FIG. 8 is a block diagram of the BS2 in wireless telecommunication network according to one embodiment of the present invention. The BS2 comprises a first wireless resource allocating means 21 and a second wireless resource allocating means 22. The first wireless resource allocating means 21 comprises a first receiving means 211 and a first determining means 212. Firstly, the first receiving means 211 receives group-related information of one or more groups of radio bearers from UE1 and other information needed for allocating resource for UE1. Then, the first determining means 212 determines the wireless resource allocated for each group of radio bearers in the UE1 according to the received group-related information and the other information needed for allocating resource for UE1.

Here, the group-related information comprises the number of the triggered one or more groups of radio bearers, the group indicator and the overall service data amount of each of the triggered groups of radio bearers, and the order thereof is shown in FIG. 2a, or FIG. 2b, but not limited by this. Here, the other information needed for allocating resource for UE1 comprises the information such as channel condition, etc.

The second wireless resource allocating means 22 comprises a second receiving means 221 and a second determining means 222. The second receiving means 221 receives emergency indication information and other information needed for allocating resource for UE1 from UE1. The second determining means 222 determines wireless resource allocated for radio bearers in the emergency in UE1 according to the emergency indication information and the other information needed for allocating resource for UE1. Wherein, the emergency indication information comprises the information for indicating the emergent situation and/or the emergent level, and the other information needed for allocating resource for UE1 comprises the information such as channel condition, etc.

In practical situation, for those latency-sensitive services, the emergency indication information is used to indicate that a certain number of bits (L1) have already waited in the RLC buffer for a certain time (T1). For those error-sensitive services, the emergency indication information is used to indicate that a certain number of bits (L2) will be abandoned by the RLC abandon mechanism after a certain time (T2). L1, L2, T1, T2 can be determined according to the QoS of each radio bearer.

When the emergency indication information is implemented, only one bit may be needed for all radio bearers. When one bit is applied, as long as a radio bearer satisfies the emergent condition, the radio bearer is in the emergency, and the emergent bit is set to "emergent". And only when all the radio bearers are in the un-emergent condition, the emergent bit is set to "un-emergent". Such reporting method can provide transmission latency and data packet loss information with least signaling overhead. BS2 allocated wireless resource to UE1 in the emergency, and UE1 determines the radio bearer to which the wireless resource is provided.

Also, each group of radio bearers (the group of multiple radio bearers with the same priority) or each radio bear can use one bit to indicate whether each group of radio bearers or each radio bearer is in the emergency. This method has better granularity, it can provide transmission latency and data packet loss information with better granularity, with which the BS2 can schedule more accurately, but compared with the above mentioned method that all radio bearers share one bit, this method requires larger signaling overhead.

Furthermore, two or three or more bits can replace the one bit in the above two methods. More than one bits can define multiple emergent situation level, which can differentiate the emergent degrees so that the BS2 can obtain more detailed transmission latency and data packet loss information, thus handle these Qos information more flexibly. Compared with one bit, the signaling overhead is larger in this method.

The description of the embodiments of the present invention is given as above. It should be understood that the present invention is not limited to the above-mentioned specific embodiments, those skilled in the art can make various modification or amendment in the scope of the appended claims.

What is claimed is:

1. A method in a user equipment in wireless telecommunication network for reporting request information for uplink scheduling to a base station, comprising the steps of:
   a. computing the overall service data amount of all radio bearers in each group of radio bearers in the buffer of said user equipment, wherein, each group of radio bearers comprises one or more radio bearers with the same priority;
   b. only reporting group-related information of triggered one or more groups of radio bearers to said base station.

2. A method according to claim 1, characterized in that, said step b comprises the steps of:
   judging whether said each group of radio bearers is triggered;
   when one or more groups of radio bearers therein are triggered, sending group-related information of said triggered one or more groups of radio bearers to said base station.

3. A method according to claim 2, characterized in that, said step of judging whether said each group of radio bearers is triggered comprises:
   when the predefined report time of said one or more groups of radio bearers arrives, judging said one or more groups of radio bearers are triggered.

4. A method according to claim 3, characterized in that, said predefined report time is periodical.

5. A method according to claim 1, characterized in that, said step of judging whether said each group of radio bearers is triggered comprises:
   when the overall service data amount of one or more groups of radio bearers in the buffer of said user equipment exceeds or is lower than the corresponding predefined threshold, judging said one or more groups of radio bearers are triggered.

6. A method according to claim 1, characterized in that, group-related information of said each group of radio bearers is sent to said base station via the data frame on the media access control layer.

7. A method according to claim 1, characterized in that, group-related information of said each group of radio bearers is sent to said base station via a new control protocol data unit.

8. A method in a user equipment in wireless telecommunication network for reporting request information for uplink scheduling to a base station, comprising the steps of:
   computing the overall service data amount of all radio bearers in each group of radio bearers in the buffer of said user equipment, wherein, each group of radio bearers comprises one or more radio bearers with the same priority; and
   only reporting group-related information of triggered one or more groups of radio bearers to said base station;
   wherein said group-related information comprises the number of said triggered groups of radio bearers, the group indicator of each of said triggered groups of radio bearers and the overall data amount of each of said triggered groups of radio bearers.

9. A reporting device in a user equipment in wireless telecommunication network for reporting request information for uplink scheduling to a base station, comprising:
   a computing means for computing the overall service data amount of all radio bearers in each group of radio bearers in the buffer of said user equipment, wherein, each group of radio bearers comprises one or more radio bearers with the same priority;
   a controlled sending means for only reporting group-related information of triggered one or more groups of radio bearers to said base station.

10. A reporting device according to claim 9, characterized in that, said controlled sending means comprises:
    a judging means for judging whether said each group of radio bearers is triggered;
    a sending means for when one or more groups of radio bearers therein are triggered, sending group-related information of said triggered one or more groups of radio bearers to said base station.

11. A reporting device according to claim 10, characterized in that, said judging means is further used for when the overall service data amount of one or more groups of radio bearers in the buffer of said user equipment exceeds or is lower than the corresponding predefined threshold, judging said one or more groups of radio bearers are triggered.

12. A reporting device according to claim 10, characterized in that, said judging means is further used for when the predefined report time of said one or more groups of radio bearers arrives, judging said one or more groups of radio bearers are triggered.

13. A reporting device according to claim 12, characterized in that, said predefined report time is periodical.

14. A reporting device according to claim 9, characterized in that, group-related information of said each group of radio bearers is sent to said base station via the data frame on the media access control layer.

15. A reporting device according to claim 9, characterized in that, group-related information of said each group of radio bearers is sent to said base station via a new control protocol data unit.

16. A reporting device in a user equipment in wireless telecommunication network for reporting request information for uplink scheduling to a base station comprising:
    a computing means for computing the overall service data amount of all radio bearers in each group of radio bearers in the buffer of said user equipment, wherein, each group of radio bearers comprises one or more radio bearers with the same priority; and
    a controlled sending means for only reporting group-related information of triggered one or more groups of radio bearers to said base station;
    wherein said group-related information comprises the number of said triggered groups of radio bearers, the group indicator of each of said triggered groups of radio bearers and the overall data amount of each of said triggered groups of radio bearers.

17. A method in a base station in a wireless telecommunication network for allocating wireless resource for a user equipment, comprising the steps of:
    i. receiving group-related information of one or more groups of radio bearers from said user equipment, said received group-related information being for only those one or more groups of radio bearers that have been triggered;
    ii. determining wireless resource allocated for each group of radio bearers in said user equipment according to said group-related information.

18. A method in a base station in a wireless telecommunication network for allocating wireless resource for a user equipment, comprising the steps of:
    receiving group-related information of one or more groups of radio bearers from said user equipment; and
    determining wireless resource allocated for each group of radio bearers in said user equipment according to said group-related information;

wherein said group-related information comprises the number of triggered groups of radio bearers, the group indicator of each of said triggered groups of radio bearers and the overall data amount of each of said triggered groups of radio bearers.

19. A wireless resource allocating device in a base station in wireless telecommunication network for allocating wireless resource for a user equipment, comprising:
- a receiving means used for receiving group-related information of one or more groups of radio bearers from said user equipment, said received group-related information being for only those one or more groups of radio bearers that have been triggered;
- a determining means used for determining wireless resource allocated for each group of radio bearers in said user equipment according to said group-related information.

20. A wireless resource allocating device in a base station in wireless telecommunication network for allocating wireless resource for a user equipment, comprising:
- a receiving means used for receiving group-related information of one or more groups of radio bearers from said user equipment; and
- a determining means used for determining wireless resource allocated for each group of radio bearers in said user equipment according to said group-related information;

wherein said group-related information comprises the number of triggered groups of radio bearers, the group indicator of each of said triggered groups of radio bearers and the overall data amount of each of said triggered groups of radio bearers.

* * * * *